United States Patent
Yoshida et al.

(10) Patent No.: US 7,490,182 B2
(45) Date of Patent: Feb. 10, 2009

(54) SWITCHING CONTROL CIRCUIT PROVIDED WITH SERIAL TO PARALLEL CONVERTER AND STORAGE UNIT, AND RADIO COMMUNICATION APPARATUS USING THE SAME

(75) Inventors: Shoji Yoshida, Kanagawa (JP); Kaoru Ishida, Osaka (JP); Hiroshi Yajima, Kanagawa (JP)

(73) Assignee: Panasonic Corporation, Osaka (JP)

( * ) Notice: Subject to any disclaimer, the term of this patent is extended or adjusted under 35 U.S.C. 154(b) by 256 days.

(21) Appl. No.: 11/399,370

(22) Filed: Apr. 7, 2006

(65) Prior Publication Data

US 2006/0253632 A1 Nov. 9, 2006

(30) Foreign Application Priority Data

Apr. 8, 2005 (JP) ............................ P2005-111817

(51) Int. Cl.
G06F 13/00 (2006.01)
H04J 14/00 (2006.01)
(52) U.S. Cl. ........................................ 710/71; 370/307
(58) Field of Classification Search .................. 710/71; 370/307
See application file for complete search history.

(56) References Cited

U.S. PATENT DOCUMENTS 6,532,372 B1 * 3/2003 Hwang ........................ 455/559
2003/0163656 A1 * 8/2003 Ganton ........................ 711/154
2004/0078513 A1 * 4/2004 Yamazaki .................... 711/104
2004/0166823 A1 8/2004 Alderton

OTHER PUBLICATIONS

Ian R. Sinclair, Definition of 'ferroelectric RAM', 2000, Collins Dictionary of Computing.*
Horn et al., Cellular and WLAN Convergence, Oct. 16, 2002, Roke Manor Research.*
Semiconductor product information "NJG1540JA3, 5×10 dual-band antenna switch GaAs MMIC", New Japan Radio Co., Ltd., http://semicon.njr.co.jp/pdf/ie/ie10008.pdf, Apr. 3, 2006, pp. 1-14.

* cited by examiner

*Primary Examiner*—Henry W. H. Tsai
*Assistant Examiner*—Hyun Nam
(74) *Attorney, Agent, or Firm*—Wenderoth, Lind & Ponack, L.L.P.

(57) ABSTRACT

A switching control circuit includes a serial-to-parallel converter, a rewritable storage device, and a decoder. The serial-to-parallel converter performs serial-to-parallel conversion for converting an inputted first control signal into a first parallel signal, and outputs the first parallel signal. The rewritable storage device has a write mode and a read mode selectively switched over in response to a storage mode switching signal, stores therein data of the first parallel signal in the write mode, and outputs the stored data as a second parallel signal in the read mode. In the read mode, the decoder decodes the first control signal and the second parallel signal to generate and output a plurality of element control signals to a plurality of elements, respectively. In the write mode, the decoder holds the plurality of element control signals generated in the read mode.

8 Claims, 4 Drawing Sheets

Fig.2

| Storage Mode of FeRAM12 | Transmission and Reception Mode | | | Storage Mode Switching Signal | Switching Control Signal | | Parallel Signal | | | Switching Control Signal | | | | | | | | | |
|---|---|---|---|---|---|---|---|---|---|---|---|---|---|---|---|---|---|---|---|
| | Transmission and Reception System | Band CDMA | Band GSM | S0 | C1 | C2 | PP1 | PP2 | PP3 | M1 | M2 | M3 | M4 | M5 | M6 | M7 | M8 | M9 | M10 |
| Memory Holding Mode | * | * | * | L | L | L | Hi-Z | Hi-Z | Hi-Z | * | * | * | * | * | * | * | * | * | * |
| Write Mode | * | * | * | H | SERIAL CLOCK SIGNAL | SERIAL SIGNAL | Hi-Z | Hi-Z | Hi-Z | * | * | * | * | * | * | * | * | * | * |
| Read Mode | CDMA | B1 | — | L | L | H | L | L | L | H | L | L | H | L | L | L | L | L | L |
| | CDMA | B2 | — | L | L | H | L | L | H | H | L | L | L | L | H | L | L | L | L |
| | CDMA | B3 | — | L | L | H | L | H | L | H | L | H | L | L | L | L | L | L | L |
| | CDMA | B4 | — | L | L | H | L | H | H | H | L | L | L | H | L | L | L | L | H |
| | GSM | — | B1 | L | H | L | H | L | L | L | H | H | L | L | L | L | L | L | L |
| | GSM | — | B2 | L | H | L | H | L | H | L | H | L | L | L | H | L | L | L | L |
| | GSM | — | B3 | L | H | L | H | H | L | L | H | L | H | L | L | L | L | L | L |
| | GSM | — | B4 | L | H | L | H | H | H | L | H | L | L | L | L | L | L | L | H |
| | CDMA&GSM | B1 | B1 | L | H | H | H | L | L | H | H | H | L | L | L | L | L | L | L |
| | CDMA&GSM | B2 | B2 | L | H | H | H | L | H | H | H | L | L | L | H | L | L | L | L |
| | CDMA&GSM | B3 | B3 | L | H | H | H | H | L | H | H | L | H | L | L | L | L | L | L |
| | CDMA&GSM | B4 | B4 | L | H | H | H | H | H | H | H | L | L | H | L | L | L | L | H |
| | CDMA&GSM | B1 | B2 | L | H | H | L | L | H | H | H | L | L | L | H | H | L | L | L |
| | CDMA&GSM | B1 | B3 | L | H | H | L | H | L | H | H | L | H | L | L | H | L | L | L |
| | CDMA&GSM | B1 | B4 | L | H | H | L | H | H | H | H | L | L | H | L | H | L | L | H |
| | CDMA&GSM | B2 | B1 | L | H | H | H | L | L | H | H | L | L | L | H | L | H | L | L |
| | CDMA&GSM | B2 | B3 | L | H | H | L | H | L | H | H | L | H | L | L | L | H | L | L |
| | CDMA&GSM | B2 | B4 | L | H | H | L | H | H | H | H | L | L | H | L | L | H | L | H |
| | CDMA&GSM | B3 | B1 | L | H | H | H | L | L | H | H | L | L | L | H | L | L | H | L |
| | CDMA&GSM | B3 | B2 | L | H | H | H | L | H | H | H | L | L | L | H | L | L | H | L |
| | CDMA&GSM | B3 | B4 | L | H | H | L | H | H | H | H | L | L | H | L | L | L | H | H |
| | CDMA&GSM | B4 | B1 | L | H | H | H | L | L | H | H | L | L | L | L | L | L | L | H |
| | CDMA&GSM | B4 | B2 | L | H | H | H | L | H | H | H | L | L | L | H | L | L | L | H |
| | CDMA&GSM | B4 | B3 | L | H | H | H | H | L | H | H | L | H | L | L | L | L | L | H |

Hi-Z INDICATES HIGH IMPEDANCE STATE.
SYMBOL * INDICATES HOLDING PREVIOUS STATE.

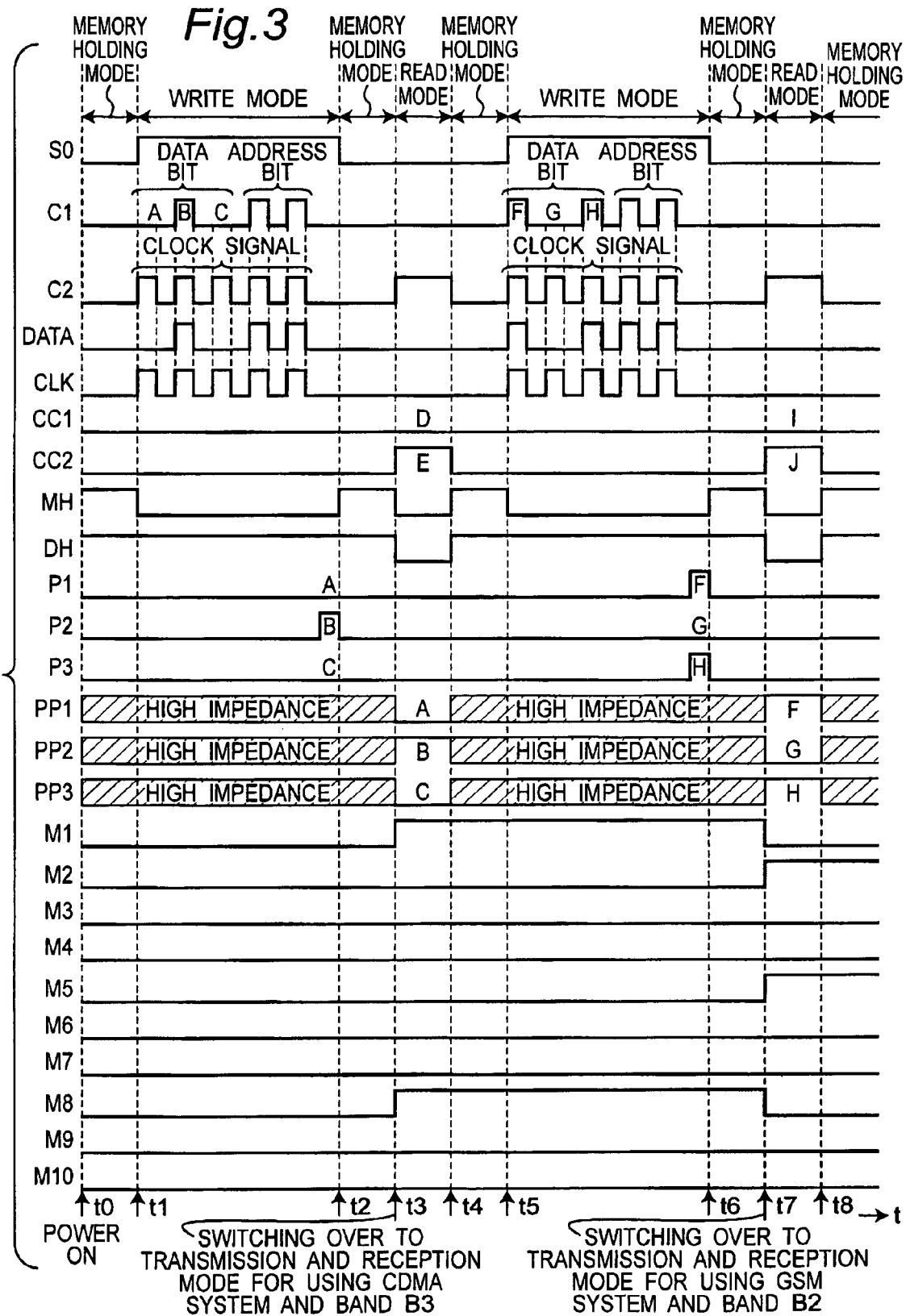

SWITCHING CONTROL CIRCUIT PROVIDED WITH SERIAL TO PARALLEL CONVERTER AND STORAGE UNIT, AND RADIO COMMUNICATION APPARATUS USING THE SAME

BACKGROUND OF THE INVENTION

1. Field of the Invention

The present invention relates to a switching control circuit for use in a radio communication apparatus. In particular, the present invention relates to a switching control circuit for use in a radio communication apparatus for transmitting and receiving a signal with switching over between a GSM (Global System for Mobile Communication) mode and a CDMA (Code Division Multiple Access) mode, and a radio communication apparatus including the switching control circuit, where the GSM mode is a mode such as a GSM system, and the CDMA mode is a mode such as a WCDMA (Wideband Code Division Multiple Access) system or a CDMA 2000 system.

2. Description of the Related Art

In recent years, a mobile telephone has been developed and put to practical use, where the mobile telephone has a multi-mode radio communication function for selectively switching over between the GSM mode, such as the GSM system which is called the second generation, and the CDMA mode which is called the third generation.

Nowadays, in the GSM system, a mobile telephone system has been established by using a quad-band that uses four bands in total including two bands located in 800 MHz band and two bands located in 1.8 GHz band. In addition, in the WCDMA system, a mobile telephone system has been established by using nine bands of Bands I to IX.

In order to constitute a multi-mode transmitter circuit for switching over among a plurality of different systems as described, a multi-mode radio apparatus according to a prior art was constituted by including a switching controller circuit for selectively switching over among the plurality of systems and bands, and a controller for controlling the operation of the switching controller circuit (See United States patent application publication No. 2004/0166823, and semiconductor product information "NJG1540JA3, 5×10 dual-band antenna switch GaAsMMIC", New Japan Radio Co., Ltd., http://semicon.njr.cojp/pdf/ie/ie10008.pdf, Apr. 3, 2006).

However, the radio communication apparatus constituted as stated above and having the GSM mode and the CDMA mode has such a problem that as the number of modes and bands switched over by the controller increases, the number of control signals for controlling the switching control circuit increases, and the number of signal lines between the controller and the switching control circuit increases. Accordingly, as the number of devices such as antennas, demodulators, and modulators increases, which are switched over with the switchover among the modes and the bands, the number of signal lines between the switching control circuits provided in the respective devices and the controller increases. This leads to such a problem that the circuit size of the entire radio communication apparatus becomes larger.

SUMMARY OF THE INVENTION

An essential object of the present invention is to provide a switching control circuit for use in a radio communication apparatus for switching over among a plurality of modes and transmitting and receiving a signal, capable of solving the above-described problems, and being made smaller in the number of signal lines and being made smaller in the circuit size as compared with that of the prior art, and to provide a radio communication apparatus including the switching control circuit.

According to the first aspect of the present invention, there is provided a switching control circuit for controlling operations of a plurality of elements, respectively, by generating a plurality of element control signals based on an inputted storage mode switching signal and an inputted first control signal. The switching control circuit includes a serial-to-parallel converter, a rewritable storage device, and a decoder. The serial-to-parallel converter performs serial-to-parallel conversion for converting a first control signal into a first parallel signal, and outputs the first parallel signal. The rewritable storage device has a write mode and a read mode selectively switched over in response to a storage mode switching signal. In addition, the storage device stores therein data of the first parallel signal in the write mode, and outputs the stored data as a second parallel signal in the read mode. In the read mode, the decoder decodes the first control signal and the second parallel signal so as to generate and output the plurality of element control signals to the plurality of elements, respectively. In the write mode, the decoder holds the plurality of element control signals generated in the read mode.

In addition, in the above-mentioned switching control circuit, the first control signal preferably includes an address of the switching control circuit, and the serial-to-parallel converter performs the serial-to-parallel conversion only when the address included in the first control signal coincides with an address of the switching control circuit.

Further, the above-mentioned switching control circuit further includes an output holding circuit for generating a memory holding signal and a decoder output holding signal based on the storage mode switching signal, the first control signal and a second control signal, outputting the memory holding signal to the storage device, and outputting the decoder output holding signal to the decoder. The storage device further has a memory holding mode. In this case, the write mode, the read mode and the memory holding mode are selectively switched over in response to the storage mode switching signal and the memory holding signal. In the memory holding mode, the storage device holds the data stored in the write mode, and in the memory holding mode, the decoder holds the plurality of element control signals based on the decoder output holding signal.

In the above-mentioned switching control circuit, the storage device is preferably a ferroelectric random access memory.

According to the second aspect of the present invention, there is provided a radio communication apparatus for transmitting and receiving a predetermined radio signal. The radio communication apparatus includes at least one above-mentioned switching control circuit.

The above-mentioned radio communication apparatus preferably further includes at least one circuit of an antenna switching circuit, a demodulator circuit, and a modulator circuit. The switching control circuit is provided in each of the antenna switching circuit, the demodulator circuit, and the modulator circuit, and the switching control circuit controls the operations of the plurality of elements provided therein based on the inputted storage mode switching signal and the inputted first control signal.

According to the third aspect of the present invention, there is provided a radio communication apparatus for transmitting and receiving a predetermined radio signal. The radio communication apparatus includes a plurality of above-mentioned switching control circuit.

The above-mentioned radio communication apparatus preferably further includes a plurality of circuits selected among an antenna switching circuit, a demodulator circuit, and a modulator circuit. The plurality of switching control circuits are provided in the plurality of selected circuits, respectively, and each of the switching control circuits controls the operations of the plurality of elements provided therein based on the inputted storage mode switching signal and the inputted first control signal.

The switching control circuit according to the present invention exhibits such an advantageous effect that the switching control circuit is made smaller in the number of signal lines and is made smaller in the circuit size as compared with that of the prior art. In addition, the radio communication apparatus according to the present invention includes the above-stated switching control circuit, and therefore, exhibits such an advantageous effect that the radio communication apparatus is made smaller in the number of signal lines and is made smaller in the circuit size as compared with that of the prior art.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 2 is a diagram showing an example of a table showing levels of a storage mode switching signal S0 and switching control signals C1 and C2 inputted from a controller 50 to a switching control circuit 10, parallel signals PP1 to PP3 outputted from an FeRAM 12 to a decoder 13, and switching control signals M1 to M10 outputted from the decoder 13 to switches 30-1 to 30-10, respectively, when a storage mode of the FeRAM 12 of FIG. 1 and a transmission and reception mode of the radio communication apparatus 41 of FIG. 1 are changed;

FIG. 3 is a timing chart showing an operation of the switching control circuit 10 of FIG. 1.

DETAILED DESCRIPTION OF THE PREFERRED EMBODIMENTS

Preferred embodiments according the present invention will be described below with reference to the drawings. In the attached drawings, the same numerical references denote components similar to each other.

First Preferred Embodiment

Figure 1:
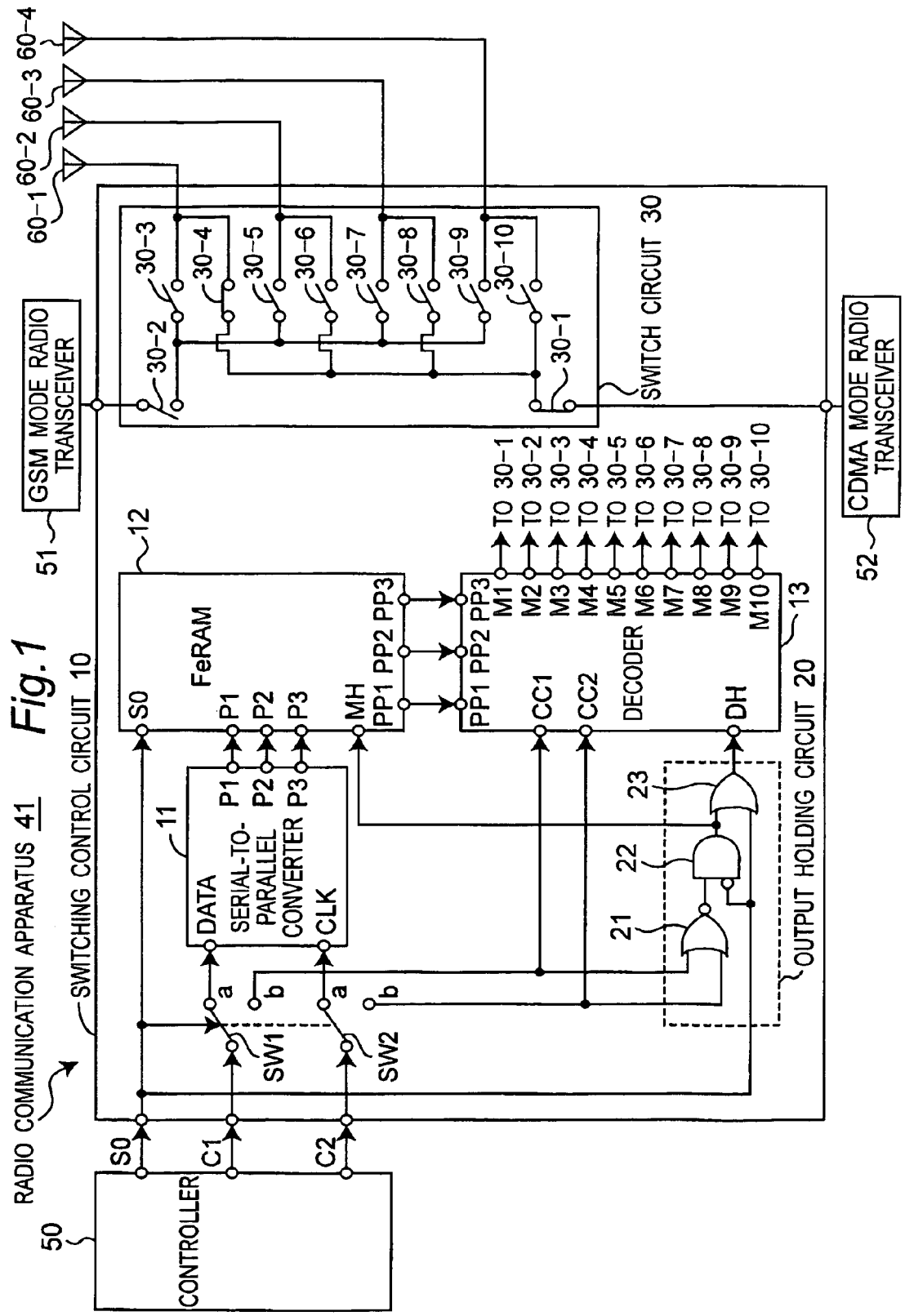
FIG. 1 is a block diagram showing a configuration of a radio communication apparatus 41 according to a first preferred embodiment of the present invention.

FIG. 1 is a block diagram showing a configuration of a radio communication apparatus 41 according to the first preferred embodiment of the present invention. Referring to FIG. 1, the radio communication apparatus 41 according to the present preferred embodiment is constituted by including a controller 50, a switching control circuit 10, a GSM mode radio transceiver 51 for transmitting and receiving a GSM radio signal, a CDMA mode radio transceiver 52 for transmitting and receiving a CDMA radio signal, and antennas 60-1 to 60-4 corresponding to four bands B1 to B4, respectively. In particular, the switching control circuit 10 is characterized by including a switch SW1, a switch SW2, a serial-to-parallel converter 11 having an unique two-bit address, a ferroelectric random access memory (referred to as an FeRAM hereinafter) 12 which is rewritable, a decoder 13, an output holding circuit 20, and a switch circuit 30. In addition, the output holding circuit 20 includes a NOR gate 21, an AND gate 22 having an inverting input terminal, and an OR gate 23. Further, the switch circuit 30 includes switches 30-1 to 30-10.

Referring to FIG. 1, the controller 50 generates a storage mode switching signal S0 and switching control signals C1 and C2, and outputs the signals S0, C1, and C2 to the switching control circuit 10. In addition, the switching control circuit 10 generates switching control signals M1 to M10 based on the storage mode switching signal S0 and the switching control signals C1 and C2 inputted from the controller 50 as will be described later in detail, and outputs the switching control signals M1 to M10 to control terminals of the switches 30-1 to 30-10, respectively. Further, the switch circuit 30 selectively connects at least one of the GSM mode radio transceiver 51 and the CDMA mode radio transceiver 52 to one or two of the antennas 60-1 to 60-4, by switching over the switches 30-1 to 30-10 so as to be turned on or off in response to inputted switching control signals M1 to M10, respectively.

FIG. 2 is a diagram showing an example of a table showing levels of the storage mode switching signal S0 and the switching control signals C1 and C2 inputted from the controller 50 to the switching control circuit 10, parallel signals PP1 to PP3 outputted from the FeRAM 12 to the decoder 13, and the switching control signals M1 to M10 outputted from the decoder 13 to the switches 30-1 to 30-10, respectively, when a storage mode of the FeRAM 12 of FIG. 1 and a transmission and reception mode of the radio communication apparatus 41 of FIG. 1 are changed. As shown in FIG. 2, the radio communication apparatus 41 has the following total 24 transmission and reception modes:

(1) Four transmission and reception modes each using one of the bands B1 to B4 in the CDMA system;

(2) Four transmission and reception modes each using one of the bands B1 to B4 in the GSM system;

(3) Four transmission and reception modes each using one of the bands B1 to B4 in common in the CDMA system and the GSM system; and (4) Twelve transmission and reception modes each using two different bands among the bands B1 to B4 in the CDMA system and the GSM system.

The switching control circuit 10 controls the switches 30-1 to 30-10 of the switch circuit 30 based on the storage mode switching signal S0 and the switching control signals C1 and C2 from the controller 50, to selectively switch over among the 24 transmission and reception modes of the radio communication apparatus 41 of FIG. 2.

Referring to FIG. 1, the controller 50 outputs the storage mode switching signal S0 to the FeRAM 12, a control terminal of the switch SW1, and a control terminal of the switch SW2, and outputs the same signal to the inverting input terminal of the AND gate 22 having the inverting input terminal and a second input terminal of the OR gate 23 of the output holding circuit 20. In this case, the switches SW1 and SW2 selectively output the switching control signals C1 and C2 from the controller 50 either to the parallel-to-serial converter 11 or to the decoder 13 and the output holding circuit 20, where the switches SW1 and SW2 are switched over to be interlocked with each other in response to the storage mode switching signal S0 from the controller 50. The controller 50 outputs the switching control signal C1 to the parallel-to-serial converter 11 via a contact "a" of the switch SW1 as a serial signal DATA. In addition, the controller 50 outputs the switching control signal C1 to the decoder 13 as a switching control signal CC1, and outputs the same signal to a first input terminal of the NOR gate 21, via a contact "b" of the switch SW1. Further, the controller 50 outputs the switching control signal C2 to the serial-to-parallel converter 11 via a contact "a" of the switch SW2 as a clock signal CLK. Still further, the controller 50 outputs the switching control signal C2 to the decoder 13 as a switching control signal CC2, and outputs the same signal to a second input terminal of the NOR gate 21, via a contact "b" of the switch SW2.

In addition, referring to FIG. 1, an output signal from the NOR gate 21 is inputted to a non-inverting input terminal of the AND gate 22 having the inverting input terminal. An output signal from the AND gate 22 having the inverting input terminal is inputted to a first input terminal of the OR gate 23, and the same output signal is inputted to the FeRAM 12 as a memory holding signal MH. Further, an output signal from the OR gate 23 is outputted to the decoder 13 as a decoder output holding signal DH. On the other hand, the serial-to-parallel converter 11 converts the inputted serial signal DATA into parallel signals P1 to P3 in synchronization with the inputted clock signal CLK, and outputs the parallel signals P1 to P3 to the FeRAM 12. In this case, as will be described later in detail with reference to FIG. 3, the serial signal DATA includes not only three data bits but also two address bits. The serial-to-parallel converter 11 performs the serial-to-parallel conversion only when an address read out from the serial signal DATA coincides with the address unique to the serial-to-parallel converter 11.

Further, referring to FIG. 1, the FeRAM 12 has three storage modes of a memory holding mode, a write mode, and a read mode. These storage modes are selectively switched over according to the storage mode switching signal S0 from the controller 50 and the memory holding signal MH from the output holding circuit 20. In this case, in the write mode, output terminals of the FeRAM 12 for respective parallel signals PP1 to PP3 are put to high impedance states, and the FeRAM 12 stores data of the inputted parallel signals P1 to P3. In addition, in the read mode, the FeRAM 12 reads out the data of the parallel signal P1 to P3 stored in the write mode, and outputs the data to the decoder 13 as the parallel signals PP1 to PP3, respectively. Further, in the memory holding mode, the output terminals of the FeRAM 12 for the respective parallel signals PP1 to PP3 are put to the high impedance states so that the write and read operations of data to and from the FeRAM 12 are prohibited, and the FeRAM 12 holds the data stored in the write mode.

Still further, referring to FIG. 1, in the read mode, the decoder 13 decodes the switching control signals CC1 and CC2 from the controller 50 and the parallel signals PP1 to PP3 from the FeRAM 12 in response to the decoder output holding signal DH having a low level from the output holding circuit 20, generates the switching control signals M1 to M10, and outputs the switching control signals M1 to M10 to the control terminals of the switches 30-1 to 30-10, respectively. In addition, in the memory holding mode and the write mode, the decoder 13 outputs the switching control signals M1 to M10 to the switch circuit 30 with holding the signals M1 to M10 in response to the decoder output holding signal DH having a high level from the output holding circuit 20.

FIG. 3 is a timing chart showing an operation of the switching control circuit 10 of FIG. 1. The operation of the switching control circuit 10 of FIG. 1 is described below with reference to FIGS. 2 and 3.

Described first is such a method of switching over the switch circuit 30 so as to select a transmission and reception mode using the CDMA system and the band B3 from a state in which none of the transmission and reception modes is selected after a timing t0 at which an electric power of the radio communication apparatus 41 is turned on.

Referring to FIG. 3, the electric power of the radio communication apparatus 41 is turned on at the timing t0. Then, during a time interval from the timing t0 to a timing t1, the controller 50 generates the storage mode switching signal S0 having the low level, which is an initial value, and the switching control signals C1 and C2 each having the low level, which is an initial value, and outputs the generated signals S0, C1, and C2 to the switching control circuit 10. The switches SW1 and SW2 are switched over to the contacts "b" thereof in response to the storage mode switching signal S0 having the low level. In addition, the output holding circuit 20 generates the memory holding signal MH having the high level based on the storage mode switching signal S0 having the low level and the switching control signals C1 and C2 each having the low level inputted from the controller 50, and outputs the generated signal MH to the FeRAM 12. In addition, the output holding circuit 20 generates the decoder output holding signal DH having the high level, and outputs the generated signal DH to the decoder 13. The FeRAM 12 is set to the memory holding mode in response to the storage mode switching signal S0 having the low level and the memory holding signal MH having the high level, and the FeRAM 12 holds data stored therein as they are, where the data was stored therein when the radio communication apparatus 41 was turned off. In addition, the decoder 13 generates the switching control signals M1 to M10 having the low levels, which are initial values, and outputs the generated signals M1 to M10 to the switch circuit 30. Further, the decoder 13 holds outputs of the switching control signals M1 to M10 each having the low level, in response to the decoder output holding signal DH having the high level. During the time interval from the timing t0 to the timing t1, none of the transmission and reception modes is selected.

Next, during a time interval from the timing t1 to a timing t2, the controller 50 generates the storage mode switching signal S0 having the high level and the switching control signals C1 and C2, and outputs the generated signals S0, C1, and C2 to the switching control circuit 10. In this case, as shown in FIG. 3, the switching control signal C2 is the clock signal CLK, and the switching control signal C1 is the serial signal DATA including three data bits "A", "B" and "C" and two address bits indicating the address of the switching control circuit 10. The switching control signal C1 is outputted to the switching control circuit 10 in synchronization with the switching control signal C2 of the clock signal CLK. It is noted that three-bit data "A", "B" and "C" of the serial signal DATA are three bits out of five-bit data (which correspond to switching control five-bit data that includes the switching control signals C1 and C2 in the read mode for a time interval from a timing t3 to a timing t4 and the parallel signals PP1 to PP3 in FIG. 3) required to select the transmission and reception mode using the CDMA system and the band B3 by switching over the respective switches 30-1 to 30-10. In addition, the switches SW1 and SW2 are switched over to the contacts "a" thereof in response to the storage mode switching signal S0 having the high level, respectively. The serial-to-parallel converter 11 performs the serial-to-parallel conversion for converting the switching control signal C1 of the serial signal DATA into the parallel signal P1 having the low level, the parallel signal P2 having the high level, and the parallel signal P3 having the low level (corresponding to "A", "B" and "C" of the parallel signals P1, P2 and P3 of FIG. 3, respectively) in synchronization with the switching control signal C2 of the clock signal CLK. Then, the serial-to-parallel converter 11 outputs the parallel signals P1, P2, and P3 to the FeRAM 12.

In addition, during the time interval from the timing t1 to the timing t2, when the storage mode switching signal S0 having the high level is inputted to the inverting input terminal of the AND gate 22 having the inverting input terminal of the output holding circuit 20, the output holding circuit 20 generates the memory holding signal MH having the low level and outputs the memory holding signal MH to the FeRAM 12. In addition, the output holding circuit 20 generates the decoder output holding signal DH having the high level and outputs the decoder output holding signal DH to the decoder 13. Further, the FeRAM 12 is set to the write mode in response to the storage mode switching signal S0 having the high level and the memory holding signal MH having the low level, and the FeRAM 12 stores therein data of the parallel signals P1 to P3 inputted from the serial-to-parallel converter 11. In this case, in the write mode, the respective parallel signal output terminals of the FeRAM 12 are put to the high impedance states, and the FeRAM 12 does not output the parallel signals PP1 to PP3 to the decoder 13. On the other hand, the decoder 13 holds low output levels of the switching control signals M1 to M10 in response to the decoder output holding signal DH having the high level. In this case, during the time interval from the timing t1 to the timing t2, none of the transmission and reception modes is selected.

Next, during a time interval from the timing t2 to the timing t3, the controller 50 generates the storage mode switching signal S0 having the low level and the switching control signals C1 and C2 each having the low level, and outputs the generated signals S0, C1, and C2 to the switching control circuit 10. During the time interval from the timing t2 to the timing t3, the FeRAM 12 is set to the memory holding mode, and the decoder 13 holds the low output levels of the switching control signals M1 to M10.

Next, during the time interval from the timing t3 to the timing t4, the controller 50 generates the storage mode switching signal S0 having the low level, the switching control signal C1 having the low level, and the switching control signal C2 having the high level, and outputs the generated signals S0, C1, and C2 to the switching control circuit 10. The switches SW1 and SW2 are switched over to the contacts "b" thereof in response to the storage mode switching signal S0 having the low level, respectively. The switching control signal C1 having the low level is outputted to the output holding circuit 20 via the contact "b" of the switch SW1, and is outputted to the decoder 13 as the switching control signal CC1 having the low level (indicated by "D" in FIG. 3). In addition, the switching control signal C2 having the high level is outputted to the output holding circuit 20 via the contact "b" of the switch SW2, and is outputted to the decoder 13 as the switching control signal CC2 having the high level (indicated by "E" in FIG. 3). In this case, it is noted that the switching control signals CC1 and CC2 are remaining two bits (indicated by "D" and "E" in FIG. 3) among the above mentioned switching control five-bit data required to select the transmission and reception mode using the CDMA system and the band B3 by switching over the respective switches 30-1 to 30-10.

In addition, during the time interval from the timing t3 to the timing t4, the output holding circuit 20 generates the memory holding signal MH having the low level based on the inputted storage mode switching signal S0 having the low level, the switching control signal C1 having the low level, and the switching control signal C2 having the high level, and outputs the generated signal MH to the FeRAM 12. In addition, the output holding circuit 20 generates the decoder output holding signal DH having the low level and outputs the decoder output holding signal DH to the decoder 13. The FeRAM 12 is set to the read mode in response to the storage mode switching signal S0 having the low level and the memory holding signal MH having the low level, and the FeRAM 12 outputs the three-bit data stored therein in the write mode to the decoder 13 as the parallel signals PP1 to PP3 of three bits (corresponding to "A", "B" and "C" of the parallel signals PP1 to PP3 of FIG. 3, respectively). On the other hand, the decoder 13 decodes the inputted switching control signals CC1 and CC2 and parallel signals PP1 to PP3, generates the switching control signals M1 and M8 each having the high level and the switching control signals M2 to M8, M9 and M10 each having the low level, and outputs the generated switching control signals M1 to M10 to the switches 30-1 to 30-10, respectively. Due to this, the switch circuit 30 is switched over so as to select the transmission and reception mode using the CDMA system and the band B3 at the timing t3.

Described next is a method of switching over the switch circuit 30 so as to select a transmission and reception mode using the GSM system and the band B2 from a state in which the transmission and reception mode using the CDMA system and the band B3 is selected.

First of all, during a time interval from the timing t4 to a timing t5, the controller 50 generates the storage mode switching signal S0 having the low level and the switching control signals C1 and C2 each having the low level, and outputs the generated signals S0, C1, and C2 to the switching control circuit 10. At this time, the FeRAM 12 is set to the memory holding mode, and the decoder 13 holds the output levels of the switching control signals M1 to M10 for selecting the transmission and reception mode using the CDMA system and the band B3.

Next, during a time interval from the timing t5 to a timing t6, the controller 50 generates the storage mode switching signal S0 having the high level and the switching control signals C1 and C2, and outputs the generated signals S0, C1, and C2 to the switching control circuit 10. In this case, as shown in FIG. 3, the switching control signal C2 is the clock signal CLK, and the switching control signal C1 is the serial signal DATA including three data bits "F", "G" and "H" and the two address bits indicating the address of the switching control circuit 10. The switching control signal C1 is outputted to the switching control circuit 10 in synchronization with the switching control signal C2 of the clock signal CLK. In this case, it is noted that the three-bit data "F", "G" and "H" of the serial signal DATA are three bits out of five-bit data (which correspond to switching control five-bit data that includes the switching control signals C1 and C2 in the read mode for a time interval from a timing t7 to a timing t8 and the parallel signals PP1 to PP3 in FIG. 3) required to select the transmission and reception mode using the GSM system and the band B2 by switching over the respective switches 30-1 to 30-10. In addition, the switches SW1 and SW2 are switched over to the contacts "a" thereof in response to the storage mode switching signal S0 having the high level, respectively. The serial-to-parallel converter 11 performs the serial-to-parallel conversion for converting the switching control signal C1 of the serial signal DATA into the parallel signal P1 having the high level, the parallel signal P2 having the low level, and the parallel signal P3 having the high level (corresponding to "F", "G" and "H" of the parallel signals P1, P2 and P3 of FIG. 3, respectively) in synchronization with the switching control signal C2 of the clock signal CLK. Then, the serial-to-parallel converter 11 outputs the parallel signals P1, P2, and P3 to the FeRAM 12.

In addition, during the time interval from the timing t5 to the timing t6, when the storage mode switching signal S0 having the high level is inputted to the inverting input terminal of the AND gate 22 having the inverting input terminal of the output holding circuit 20, the output holding circuit 20 generates the memory holding signal MH having the low level and outputs the memory holding signal MH to the FeRAM 12. In addition, the output holding circuit 20 generates the decoder output holding signal DH having the high level and outputs the decoder output holding signal DH to the decoder 13. Further, the FeRAM 12 is set to the write mode in response to the storage mode switching signal S0 having the high level and the memory holding signal MH having the low level, and the FeRAM 12 stores therein data of the parallel signals P1 to P3 inputted from the serial-to-parallel converter 11. In this case, in the write mode, the respective parallel signal output terminals of the FeRAM 12 are put to the high impedance states, and the FeRAM 12 does not output the parallel signals PP1 to PP3 to the decoder 13. The decoder 13 holds output levels of the switching control signals M1 to M10 for selecting the transmission and reception mode using the CDMA system and the band B3.

Next, during a time interval from the timing t6 to the timing t7, the controller 50 generates the storage mode switching signal S0 having the low level and the switching control signals C1 and C2 each having the low level, and outputs the generated signals S0, C1, and C2 to the switching control circuit 10. During the time interval from the timing t6 to the timing t7, the FeRAM 12 is set to the memory holding mode, and the decoder 13 holds the output levels of the switching control signals M1 to M10 for selecting the transmission and reception mode using the CDMA system and the band B3.

Next, during the time interval from the timing t7 to the timing t8, the controller 50 generates the storage mode switching signal S0 having the low level, the switching control signal C1 having the low level, and the switching control signal C2 having the high level, and outputs the generated signals S0, C1, and C2 to the switching control circuit 10. The switches SW1 and SW2 are switched over to the contacts "b" thereof in response to the storage mode switching signal S0 having the low level, respectively. The switching control signal C1 having the low level is outputted to the output holding circuit 20 via the contact "b" of the switch SW1, and is outputted to the decoder 13 as the switching control signal CC1 having the low level (indicated by "I" in FIG. 3). In addition, the switching control signal C2 having the high level is outputted to the output holding circuit 20 via the contact "b" of the switch SW2, and is outputted to the decoder 13 as the switching control signal CC2 having the high level (indicated by "J" in FIG. 3). In this case, it is noted that the switching control signals CC1 and CC2 are remaining two bits (indicated by "I" and "J" in FIG. 3) among the switching control five-bit data required to select the transmission and reception mode using the GSM system and the band B2 by switching over the respective switches 30-1 to 30-10.

In addition, during the time interval from the timing t7 to the timing t8, the output holding circuit 20 generates the memory holding signal MH having the low level based on the inputted storage mode switching signal S0 having the low level, the switching control signal C1 having the low level, and the switching control signal C2 having the high level, and outputs the memory holding signal MH to the FeRAM 12. In addition, the output holding circuit 20 generates the decoder output holding signal DH having the low level and outputs the decoder output holding signal DH to the decoder 13. The FeRAM 12 is set to the read mode in response to the storage mode switching signal S0 having the low level and the memory holding signal MH having the low level, and the FeRAM 12 outputs the three-bit data stored therein in the write mode to the decoder 13 as the parallel signals PP1 to PP3 of three bits (corresponding to "F", "G" and "H" of the parallel signals PP1 to PP3 of FIG. 3, respectively). The decoder 13 decodes the inputted switching control signals CC1 and CC2 and the parallel signals PP1 to PP3, generates the switching control signals M1, M3, M4, and M6 to M10 each having the low level and the switching control signals M2 and M5 each having the high level, and outputs the generated switching control signals M1 to M10 to the switches 30-1 to 30-10, respectively. Due to this, the switch circuit 30 is switched over so as to select the transmission and reception mode using the GSM system and the band B2 at the timing t7.

The switch circuit 30 which selectively switches over the transmission and reception mode of the radio communication apparatus 41 among the 24 transmission and reception modes requires at least five control signals. In the radio communication apparatus according to the prior art, the controller outputs, for example, five control signals to the decoder of the switching control circuit, and the decoder decodes inputted five control signals, generates ten switching control signals, and outputs the generated signals to the switch circuit. Accordingly, the radio communication apparatus according to the prior art has such a problem that when the number of the transmission and reception modes to be switched over increases and the number of switching control signals increases, then the number of control signals outputted from the controller to the switching control circuit increases, the number of signal lines increases, and the circuit size of the entire radio communication apparatus becomes larger.

On the other hand, according to the radio communication apparatus 41 according to the present preferred embodiment, the storage mode of the FeRAM 12 is selectively switched over between the read mode and the write mode in response to the storage mode switching signal S0. In the write mode, the three-bit data among the switching control five-bit data necessary for switching over the transmission and reception mode of the radio communication apparatus 41 are outputted to the switching control circuit 10 as the serial signal, and the same three-bit data are stored in the FeRAM 12. In the read mode, stored three-bit data are read out and decoded together with the remaining two bit among the switching control five-bit data, and the switching control signals M1 to M10 are generated. Accordingly, the controller 50 outputs only the three control signals of the storage mode switching signal S0 and the control signals C1 and C2 to the switching control circuit 10. Accordingly, as compared with the switching control circuit according to the prior art, the switching control circuit according to the present preferred embodiment has such an advantageous effect of being made smaller in number of signal lines and being made smaller in the circuit size. Further, even when the number of the transmission and reception modes to be switched over increases and the number of switches that constitute the switch circuit 30 increases, the number of control signals outputted from the controller 50 to the switching control circuit 10 remains three. The switching control circuit according to the present preferred embodiment has such an advantageous effect that it is possible to remarkably reduce the number of signal lines and reduce the circuit size, as compared with the radio communication apparatus according to the prior art.

In the above-stated preferred embodiment, the serial signal DATA inputted to the serial-to-parallel converter 11 consists of the three data bits and the two address bits, however, the present invention is not limited to this. The number of bits, positions of the respective bits, and respective logics may be set to be different from those according to the present preferred embodiment. In addition, the levels of the other signals S0, C1, C2, CLK, P1 to P3, PP1 to PP3, DH, DM, and M1 to M10 may be inverted from those of FIG. 2.

In the above-stated preferred embodiment, the FeRAM 12 stores therein the data of the parallel signals P1 to P3 obtained by the serial-to-parallel conversion, however, the present invention is not limited to this. The FeRAM 12 may store therein the serial signal DATA and the clock signal CLK, and in the read mode, the FeRAM 12 may convert the serial signal DATA into the parallel signals PP1 to PP3 in synchronization with the clock signal CLK, and output the parallel signals PP1 to PP3 to the decoder 13.

In the above-stated preferred embodiment, the FeRAM 12 has the three storage modes of the memory holding mode, the write mode, and the read mode, however, the present invention is not limited to this. The FeRAM 12 may have two modes of the write mode and the read mode, and the two storage modes may be switched over between them in response to the storage mode switching signal S0.

In the above-stated preferred embodiment, the serial-to-parallel converter 11 has the unique address, however, the present invention is not limited to this. The switching control circuit 10 may have a unique address, and the serial-to-parallel converter 11 may perform the serial-to-parallel conversion only when an address read out from the switching control signal C1 inputted from the controller 50 coincides with the unique address of the switching control circuit 10.

Second Preferred Embodiment

Figure 4:
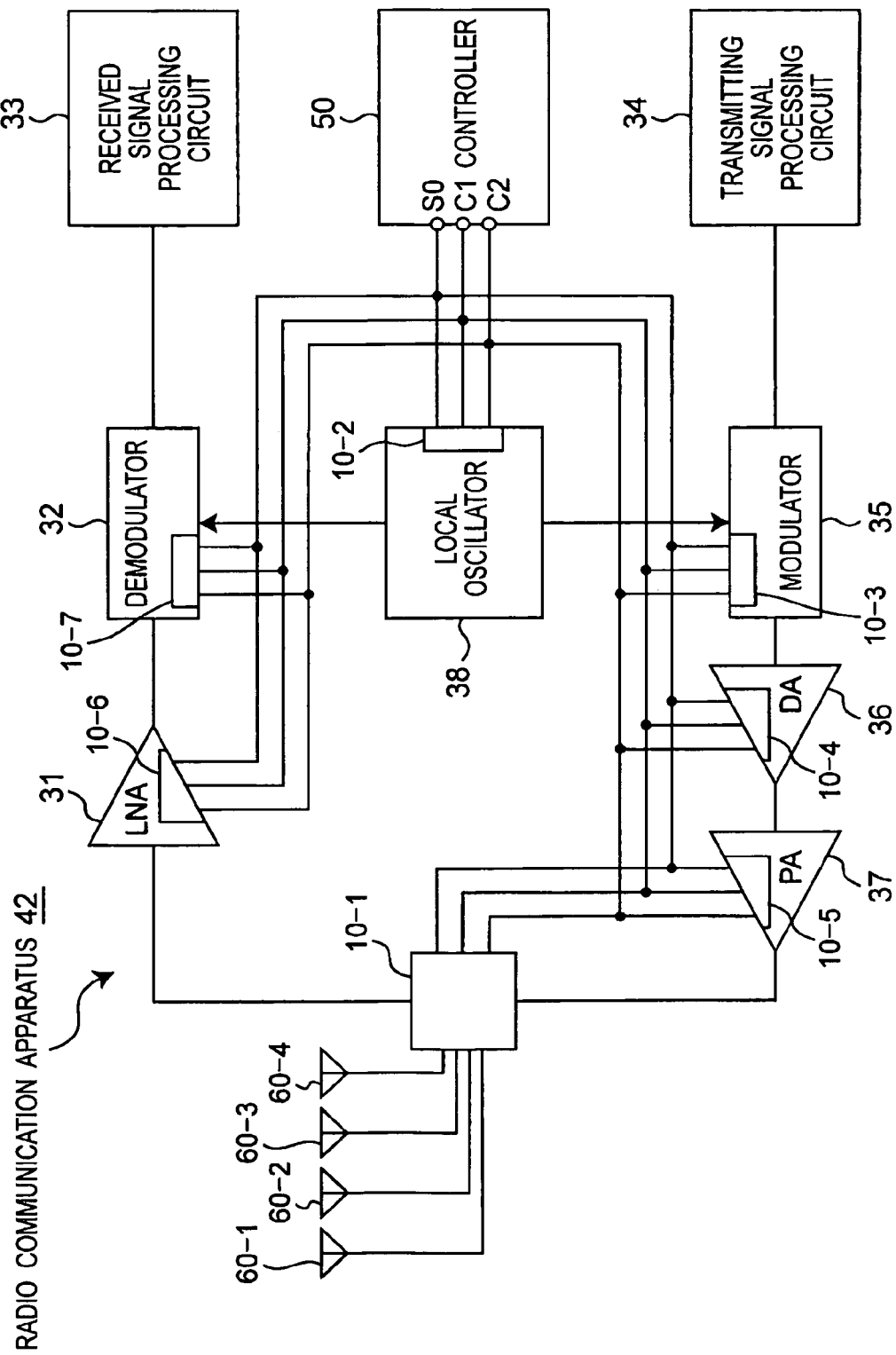
FIG. 4 is a block diagram showing a configuration of a radio communication apparatus 42 according to a second preferred embodiment of the present invention.

FIG. 4 is a block diagram showing a configuration of a radio communication apparatus 42 according to the second preferred embodiment. Referring to FIG. 4, the radio communication apparatus 42 according to the present preferred embodiment is constituted by including a controller 50, antennas 60-1 to 60-4, a switching control circuit 10-1 configured similarly to the switching control circuit 10 according to the first preferred embodiment, a low noise amplifier 31, a demodulator 32, a received signal processing circuit 33, a transmitting signal processing circuit 34, a modulator 35, a driver amplifier 36, a power amplifier 37, and a local oscillator 38. In particular, the local oscillator 38, the modulator 35, the driver amplifier 36, the power amplifier 37, the low noise amplifier 31, and the demodulator 32 are characterized by including switching control circuits 10-2 to 10-7 configured in a manner similar to that of the switching control circuit 10 according to the first preferred embodiment, respectively.

Referring to FIG. 4, the radio communication apparatus 42 has a total of 24 transmission and reception modes (See FIG. 2) which are similar to those of the radio communication apparatus 41 according to the first preferred embodiment. In addition, each of the local oscillator 38, the modulator 35, the driver amplifier 36, the power amplifier 37, the low noise amplifier 31 and the demodulator 32 has operation modes corresponding to the transmission and reception modes of the radio communication apparatus 42, respectively.

In addition, referring to FIG. 4, the controller 50 generates the storage mode switching signal S0 and the switching control signals C1 and C2, and outputs the generated signals S0, C1, and C2 to each of the switching control circuits 10-1 to 19-7. In the radio communication apparatus 42, the operation modes of each of the local oscillator 38, the modulator 35, the driver amplifier 36, the power amplifier 37, the low noise amplifier 31, and the demodulator 32 are selectively switched over to be set in response to the storage mode switching signal S0 and the switching control signals C1 and C2 from the controller 50. Each of the switching control circuits 10-1 to 10-7 has an unique address, and a serial-to-parallel converter (not shown) of each of the switching control circuits 10-1 to 10-7 performs serial-to-parallel conversion only when an address read out from the switching control signal C1 of the serial signal DATA coincides with an address of the switching control circuit corresponding to the serial-to-parallel converter.

Further, referring to FIG. 4, during radio transmission of the radio communication apparatus 42, the transmitting signal processing circuit 34 outputs transmitting data to be radio-transmitted to the modulator 35. The modulator 35 modulates a local oscillation signal from the local oscillator 38 according to inputted transmission data, and radio-transmits a modulated signal via the driver amplifier 36, the power amplifier 37, the switching control circuit 10-1, and an antenna selected from among the antennas 60-1 to 60-4 by the switching control circuit 10-1.

Still further, referring to FIG. 4, during radio reception of the radio communication apparatus 42, the demodulator 32 receives a radio received signal via the antenna selected from among the antennas 60-1 to 60-4 by the switching control circuit 10-1 and the low noise amplifier 31. In addition, the demodulator 32 subjects a radio received signal to a low frequency conversion using the local oscillation signal from the local oscillator 38, demodulates a resultant signal into a baseband signal, and outputs the baseband signal to the received signal processing circuit 33. The received signal processing circuit 33 processes an inputted baseband signal.

The radio communication apparatus 42 constituted as described above has the number of signal lines between the controller 50 and each of the switching control circuits 10-1 to 10-7, which is suppressed to three. Accordingly, it is possible to realize the radio communication apparatus such as a portable radio apparatus, being made smaller in the number of signal lines and the circuit size than the radio communication apparatus according to the prior art.

As described so far in detail, the switching control circuit according to the present invention is made smaller in the number of signal lines and is made smaller in the circuit size than the switching control circuit according to the prior art. In addition, the radio communication apparatus according to the present invention includes the above-stated switching control circuit, and therefore, the radio communication apparatus according to the present invention is made smaller in the number of signal lines and is made smaller in the circuit size than the radio communication apparatus according to the prior art.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A switching control circuit for controlling operations of a plurality of elements, said switching control circuit comprising:
   a serial-to-parallel converter for performing serial-to-parallel conversion for converting a first control signal into a first parallel signal, and outputting the first parallel signal;
   a rewritable storage device having a write mode and a read mode selectively switched over in response to a storage mode switching signal, storing therein data of the first parallel signal in the write mode, and outputting the stored data as a second parallel signal in the read mode;
   a decoder for executing the following according to the write mode or the read mode of said rewritable storage device:
      in the read mode, said decoder decoding the first control signal and the second parallel signal so as to generate and output a plurality of element control signals to said plurality of elements, respectively, and
      in the write mode, said decoder holding the plurality of element control signals generated in the read mode; and
   a switch circuit for selectively outputting, in response to the storage mode switching signal, the first control signal to either said serial-to-parallel converter or said decoder.

2. The switching control circuit as claimed in claim 1,
   wherein said switching control circuit has an address,
   wherein the first control signal includes an address, and
   wherein the serial-to-parallel converter performs the serial-to-parallel conversion only when the address included in the first control signal coincides with the address of said switching control circuit.

3. The switching control circuit as claimed in claim 1, further comprising an output holding circuit for generating a memory holding signal and a decoder output holding signal based on the storage mode switching signal, the first control signal and a second control signal, outputting the memory holding signal to said rewritable storage device, and outputting the decoder output holding signal to said decoder,
   wherein said rewritable storage device further has a memory holding mode,
   wherein the write mode, the read mode and the memory holding mode are selectively switched over in response to the storage mode switching signal and the memory holding signal,
   wherein, in the memory holding mode, said rewritable storage device holds the data stored in the write mode, and
   wherein, in the memory holding mode, said decoder holds the plurality of element control signals based on the decoder output holding signal.

4. The switching control circuit as claimed in claim 1,
   wherein the rewritable storage device is a ferroelectric random access memory.

5. A radio communication apparatus for transmitting and receiving a predetermined radio signal, said radio communication apparatus comprising at least one switching control circuit for controlling operations of a plurality of elements, wherein said switching control circuit comprises:
   a serial-to-parallel converter for performing serial-to-parallel conversion for converting a first control signal into a first parallel signal, and outputting the first parallel signal;
   a rewritable storage device having a write mode and a read mode selectively switched over in response to a storage mode switching signal, storing therein data of the first parallel signal in the write mode, and outputting stored data as a second parallel signal in the read mode;
   a decoder for executing the following according to the write mode or the read mode of said rewritable storage device:
      in the read mode, said decoder decoding the first control signal and the second parallel signal so as to generate and output a plurality of element control signals to said plurality of elements, respectively, and
      in the write mode, said decoder holding the plurality of element control signals generated in the read mode; and
   a switch circuit for selectively outputting, in response to the storage mode switching signal, the first control signal to either said serial-to-parallel converter or said decoder.

6. The radio communication apparatus as claimed in claim 5, further comprising at least one circuit of an antenna switching circuit, a demodulator circuit, and a modulator circuit,
   wherein said switching control circuit is provided in each of said antenna switching circuit, said demodulator circuit, and said modulator circuit, and
   wherein said switching control circuit controls the operations of said plurality of elements provided therein based on the storage mode switching signal and the first control signal.

7. A radio communication apparatus for transmitting and receiving a predetermined radio signal, said radio communication apparatus comprising a plurality of switching control circuits, each of said switching control circuits controlling operations of a plurality of elements, respectively,
   wherein a first control signal includes an address,
   wherein each of said switching control circuits has an address, and
   wherein each of said switching control circuits comprises:
      a serial-to-parallel converter for performing serial-to-parallel conversion for converting the first control signal into a first parallel signal, and outputting the first parallel signal, only when the address included in the first control signal coincides with the address of said switching control circuit;
      a rewritable storage device having a write mode and a read mode selectively switched over in response to a storage mode switching signal, storing therein data of the first parallel signal in the write mode, and outputting stored data as a second parallel signal in the read mode;
      a decoder for executing the following according to the write mode or the read mode of said rewritable storage device:
         in the read mode, said decoder decoding the first control signal and the second parallel signal so as to generate and output a plurality of element control signals to said plurality of elements, respectively, and
         in the write mode, said decoder holding the plurality of element control signals generated in the read mode; and a switch circuit for selectively outputting, in response to the storage mode switching signal, the first control signal to either said serial-to-parallel converter or said decoder.

8. The radio communication apparatus as claimed in claim 7, wherein the radio communication apparatus comprises a plurality of circuits selected among an antenna switching circuit, a demodulator circuit, and a modulator circuit, wherein said plurality of switching control circuits are provided in said plurality of selected circuits, respectively, and wherein each of said switching control circuits controls the operations of said plurality of elements provided therein based on the storage mode switching signal and the first control signal.

* * * * *